Oct. 22, 1935.  H. L. MASON  2,018,372
LABYRINTH PACKING DEVICE
Filed March 13, 1930
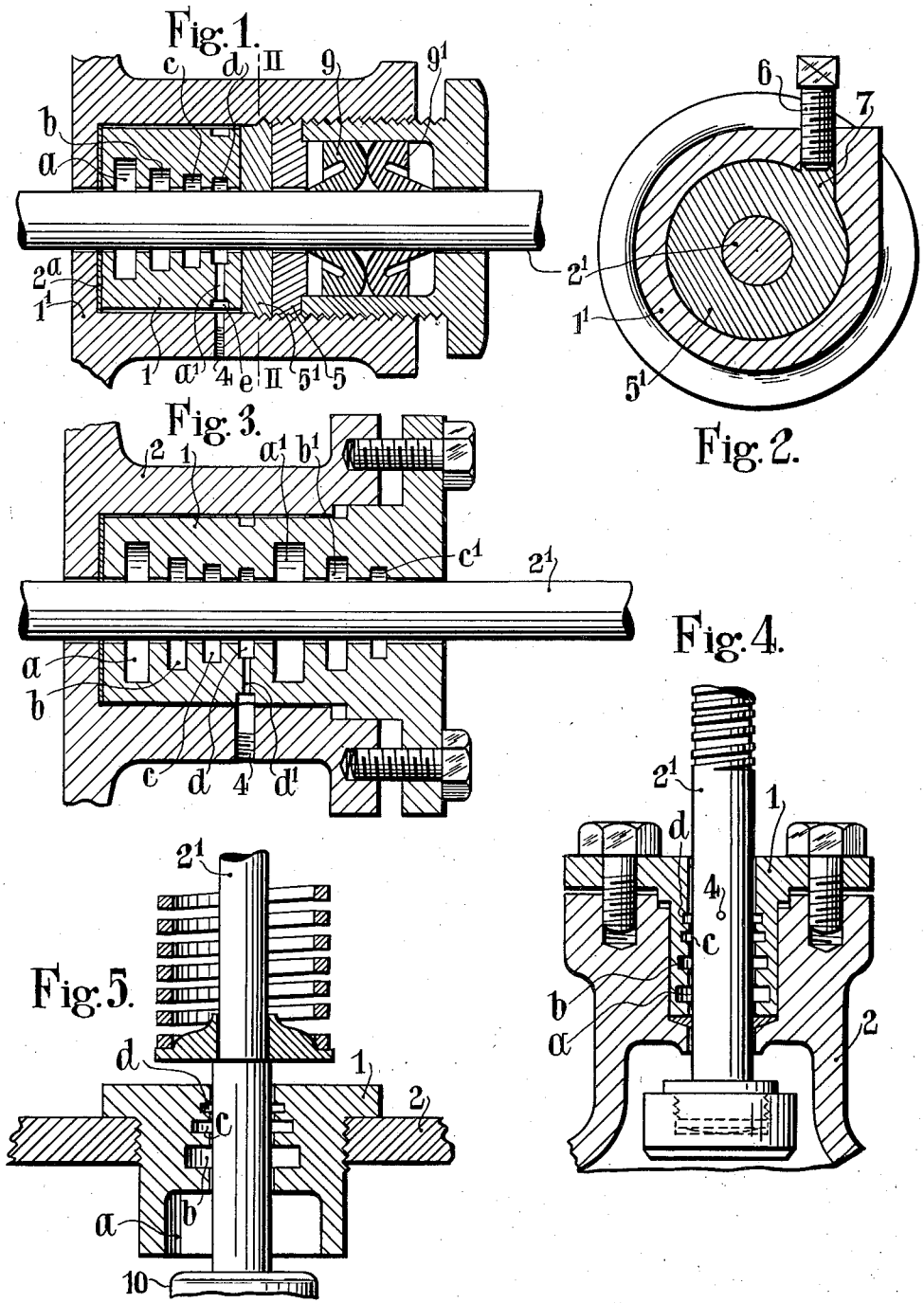
Harold L. Mason
INVENTOR.
BY George Belve Ellis
ATTORNEY.

UNITED STATES PATENT OFFICE 2,018,372

LABYRINTH PACKING DEVICE

Harold Lyall Mason, Hampstead,
London, England

Application March 13, 1930, Serial No. 435,549
In Great Britain April 24, 1929

8 Claims. (Cl. 286—10)

This invention relates to sealing devices used to prevent the leakage of fluid along a channel connecting two parts subjected to unequal pressure. It is applicable to the means used for sealing the annular space round shafts, pistons, piston rods, valve stems, spindles and other parts used in pressure vessels and apparatus whence it is desired to prevent the escape of fluid along such parts with the minimum of binding or friction.

In particular it is directed towards the type known as a labyrinth packing and provides an improved form of this device which can be used in a wide variety of applications to prevent serious leakage along a space connecting two points of unequal pressure.

In accordance with this invention I provide sealing means between two areas of different pressure, comprising in combination a block, a series of spaced open ended recesses in said block, a member in association with said block, the said member very slightly spaced apart from the open ends of the said recesses, each of said recesses being in communication with the next by means of the space defined by the member and the ends of the common walls limiting the recesses in one direction, said recesses successively diminishing in cross section as they approach the area of lower pressure, and each recess being of such an area as to cause a considerable drop in pressure in each succeeding recess as the recesses approach the low pressure end and each channel being sufficiently long to throttle the fluid down to the scale for which the succeeding recess is designed, and also in order to spread the fluid out into a thin film that can be superheated to the point required while still within the channel.

What happens is that the fluid passing along the channel of the first stage expands and eddies into chamber one. Thence it passes through the second passage and the lost heat is here restored by the mass of warm metal, therefore it superheats and the pressure increases thus forming a block against further flow. In the subsequent chambers the effect is repeated with decreasing volume until the movement disappears.

The lengths of channel along the leakage path between the chambers should be long enough to stabilize the flow. That is to say that the space between the chambers makes a narrow passage of sufficient length to assure that the flow will be definitely restricted to the amount of steam admissible along the passage between the rod and the gland. It is in this passage that the superheating takes place, and therefore there must be a solid mass of metal at this point to effect this. Moreover, if, as is the case in most labyrinths, the division between the steps is simply a point of metal almost in contact with the rod, it is possible by a transference of pressure into a velocity and heat for a much greater amount of fluid to escape than will be effectively controlled by the labyrinth device.

A labyrinth series of this type can be used as a substitute for or in combination with ordinary packing, can be bled into intermediate stages where convenient either by simple duct or an ejector, the latter being a convenient form for the disposal of condensate. The connection of one end of a series to a lower stage on a compressor piston rod packing permits a simple packing of this nature to be used on a wide range of pressures.

Although the labyrinth may be produced on either side or astride of the annular space, a quite effective packing can be made by cutting a graduated series of diminishing grooves forming chambers in the material surrounding the rod or other member which it is desired to pack. The series might consist of four chambers in diminishing series with a fifth of the same size as the fourth from which a duct for condensate can be led. Assuming that the annular clearance is of normal dimensions the first chamber might be situated as regards its commencement from the opening of the high pressure end of the channel forming the outer diameter of the annulus about one and a half times the diameter of the rod, the diameter of the chamber being about two thirds greater than the rod and the depth along the channel about one-third of the rod diameter the second chamber will be situated about one-third diameter along and have a volumetric capacity of about 50% less than the first chamber the next two chambers progressively diminishing in the same way. The chambers in such a simple form will preferably be rectangular in profile and the last as stated may have a duct to carry off condensate. The sectional profile of the chambers may be varied to avoid noise and for other reasons, and the size, progression and spacing may be varied to suit the particular conditions of service but the example given is a typical commercial one for general use.

A labyrinth of this type is conveniently made from a bronze block similar to a stuffing box gland but occupying the whole of the stuffing box space a copper ring or other packing being fitted to prevent the escape of fluid outside the block. This may also be divided lengthways, and the two halves joined with a tongue and groove. This will facilitate cleaning, though this can also be accomplished by a blowing down duct.

The accompanying drawing shows various constructions according to this invention, but it will be understood that there is a wide variety of applications in which it can be used to prevent the escape of fluid or gas through the annulus surrounding a shaft, rod, spindle piston or other member one end of which is exposed to a higher pressure than the other.

The accompanying drawing shows various constructions according to this invention, but it will be understood that there is a wide variety of applications wherein it may be desirable to prevent the escape of gas through the annulus surrounding a rod, spindle, piston valve or other object one end of which is exposed to a higher pressure than the other.

Fig. 1 shows a packing suitable for a double acting gas compressor, Fig. 2, being a section at right angles through the tangential stuffing compartment at II—II.

Fig. 3 shows a suitable arrangement for an air compressor having a leakage path taken from the centre to an intermediate stage.

Fig. 4 illustrates a gland for a stop valve and Fig. 5 a gland for a safety valve this being the device in its simplest form, and Fig. 6 illustrates the application of the invention to a valve spindle.

Fig. 1 shows an example suitable for a double acting gas compressor, Fig. 2 being a section at right angles through this example at II—II. In this example a stuffing box is formed in the cylinder 1' through which passes the piston rod 2' the inner portion of which is surrounded with a labyrinth block made according to this invention with four chambers $a$, $b$, $c$, and $d$ in the block 1 a copper ring 2a is fitted to prevent leaks round the block and the last chamber connects by a duct $a'$ with an outer groove or chamber $e$ and a duct in the cylinder 4 which may be connected to the suction or low pressure side.

The labyrinth block is held in position by a layer of plastic packing interposed between it and a retaining piece 5, and outside this again is a gland piece with two U rings 9 and 9' serving to prevent the escape of low pressure gas and the entry of air respectively. The plastic packing 5' is shown in Fig. 2 controlled tangentially by a ram screw 6 in known fashion, and serves as an emergency packing to prevent the escape of low pressure gas while changing the U packings if the compressor is not working. In this example the labyrinth acts as a permanent high pressure packing.

Fig. 3 shows a two series labyrinth block packing for an air compressor the duct 4 being connected to the intermediate stage and the labyrinth chambers $a'$, $b'$, $c'$ serving to prevent the escape of intermediate pressure air to atmosphere. In this case a second packing ring is fitted to seal the outside of the second labyrinth chamber.

Fig. 4 shows a labyrinth for a stop valve, and in this case the duct at 4 can be connected in such a way as to protect the hand from the condensate which frequently is blown from a valve on opening.

Fig. 5 is a simple example for a safety valve in which the first chamber of the labyrinth $a$ is formed by the valve 10 rising into the projecting part of the block 1 the annular line of escape in this case having more than one diameter. The clearances are such as to leave the valve stem perfectly free within the labyrinth channel, while the escape of steam into the spring space is entirely prevented.

Labyrinths on this system can take many forms without departing from the scope of the invention, they may be applied to rotary shafts, reciprocating rods or pistons, and stationary bodies surrounded by a channel or only partially so, that is to say that there need not be a complete annulus or channel connecting high and low pressure spaces but that the expansion chambers in planned succession can be applied to any channel in which it is desired to arrest the flow of a fluid or gas which is subject to more pressure at one end than the other, and is compressed by the over-pressure.

Such labyrinths may be formed out of the principal material, or made in accessory portions and fitted as may be most convenient.

What I claim and desire to secure by Letters Patent is:—

1. Labyrinth sealing means between a high pressure area and a lower pressure area comprising in combination a labyrinth block, a series of spaced recesses in said block, a rod passing centrally through said block and said recesses, each recess communicating with the next one through a narrow channel between said block and said rod, said recesses progressively diminishing in cross sectional area from the high pressure to the lower pressue area, the dimensions of the recesses being such that the second recess has a volumetric capacity of about fifty per cent less than the first recess, the subsequent recesses progressively diminishing in the same way.

2. Labyrinth sealing means between a high pressure area and a low pressure area comprising in combination a labyrinth metallic block, spaced recesses in said block, a rod passing centrally through said block and said recesses, said recesses being joined by narrow stabilizing and reheating co-related passages between said block and said rod, for the fluid to be throttled and controlled, said recesses progressively diminishing in transverse cross sectional area from the high pressure area to the lower pressure area and forming a series of expansion chambers, the second recess having a volumetric capacity of about fifty per cent less than the first recess, the subsequent recesses progressively diminishing in the same way.

3. Compressor sealing means between a high pressure area and a lower pressure side comprising in combination a stuffing box, a gland to said stuffing box, a labyrinth block in said box and integral with said gland, a plurality of series of spaced recesses in said block, a shaft passing centrally through said block and said recesses, each recess communicating with the next one through a narrow channel between said block and said rod, the recesses of each series progressively diminishing in transverse cross sectional area from the high pressure area to the low pressure area, the disposition and the dimensions of the recesses being such that the first recess is situated as regards its commencement from the opening of the high pressure end of the channel at about one and a half times the diameter of the rod, the diameter of the recess being about two thirds greater than the rod and the depth along the channel about one third of the rod diameter, and the second recess being situated about one third diameter along the rod and having a volumetric capacity of about fifty per cent less than the first recess, the next two recesses progressively diminishing in the same way, there being also provided exhaust passage means connecting the smallest recess of the first series on the high pressure side with the exterior of the stuffing box, and means for securing the gland to the stuffing box.

4. Valve sealing means between a high pressure area and a lower pressure area comprising in combination a stuffing box, a gland to said stuffing box, a labyrinth block in said stuffing box integral with said gland, spaced recesses in said block, a spring loaded valve-rod passing centrally through said labyrinth block and said recesses, each recess communicating with the next one through a narrow channel between said block and said rod said recesses progressively diminishing from the high pressure area to the lower pressure area, the diameter of the first recess being about two thirds greater than the rod and the depth along the channel about one third of the diameter of the rod, the second recess being situated about one third the diameter of the rod along said rod and having a volumetric capacity of about fifty per cent less than the first recess, the next two recesses progressively diminishing in the same way.

5. Valve sealing means between a high pressure area and a lower pressure area, comprising in combination a stuffing box, a gland to said stuffing box, a labyrinth block in said stuffing box integral with said gland, spaced recesses in said block, a valve-rod passing centrally through said labyrinth block and said recesses, each recess communicating with the next one through a narrow channel between said block and said rod, said recesses progressively diminishing from the high pressure area to the lower pressure area, the largest of said recesses being immediately adjacent the valve in the valve's open position, the diameter of the first recess being about two thirds greater than the diameter of the rod and the depth along the channel about one third of the rod diameter, the second recess being situated about one third of the diameter of the rod therealong and having a volumetric capacity of about fifty per cent less than the first recess, the next two recesses progressively diminishing in the same way, means being provided for carrying away condensate from said sealing recesses, there being also means for securing said gland to said stuffing box.

6. Sealing means between two areas of different pressure, comprising in combination a block, a member in association with said block, a series of spaced recesses in said block open ended towards said member, the said member very slightly spaced apart from the open ends of the said recesses, each of said recesses being in communication with the next by means of the space defined by the member and the ends of the common walls limiting the recesses in one direction, said recesses successively diminishing in cross section as they aproach the area of lower pressure, and each recess being such a volume as to cause a considerable drop in pressure in each succeeding recess as the recesses approach the low pressure end and each channel being sufficiently long to throttle the fluid down to the scale for which the succeeding recess is designed, and also in order to spread the fluid out into a thin film that can be superheated to the point required while still within the channel.

7. Sealing means between two areas of different pressure, comprising in combination a block, a member in association with said block, a series of spaced recesses in said block open ended towards said member, the said member very slightly spaced apart from the open ends of the said recesses, each of the said recesses being in communication with the next by means of the space defined by the member and the ends of the common walls limiting the recesses in one direction, said recesses successively diminishing in cross section as they approach the area of low pressure, and each recess being of such a volume as to cause considerable drop in pressure in each succeeding recess as the recesses approach the low pressure end.

8. Sealing means between two areas of different pressure, comprising in combination a block, a shaft in association with said block, a series of spaced recesses in said block open ended towards said shaft, the said shaft very slightly spaced apart from the open ends of the said recesses, each of said recesses being in communication with the next by means of the space defined by the shaft and the ends of the common walls limiting the recesses in one direction, said recesses successively diminishing in cross section as they approach the area of lower pressure, and each recess being of such a volume as to cause a considerable drop in pressure in each succeeding recess as the recesses approach the low pressure end, and each channel being sufficiently long to throttle the fluid down to the scale for which the succeeding recess is designed, and also in order to spread the fluid out into a thin film that can be superheated to the point required while still within the channel.

HAROLD LYALL MASON.